United States Patent [19]

Margotte et al.

[11] 4,204,047

[45] May 20, 1980

[54] THERMOPLASTIC MOULDING COMPOSITION

[75] Inventors: Dieter Margotte; Werner Nouvertné, both of Krefeld, Fed. Rep. of Germany

[73] Assignee: Bayer Akteingesellschaft, Fed. Rep. of Germany

[21] Appl. No.: 886,812

[22] Filed: Mar. 15, 1978

[30] Foreign Application Priority Data

Mar. 19, 1977 [DE] Fed. Rep. of Germany ....... 2712171

[51] Int. Cl.$^2$ ...................... C08L 51/04; C08L 33/24; C08L 69/00
[52] U.S. Cl. ........................ 525/67; 525/73; 525/146; 525/148
[58] Field of Search .......................................... 260/873

[56] References Cited

U.S. PATENT DOCUMENTS

| | | | |
|---|---|---|---|
| 3,886,231 | 5/1975 | Nield | 260/873 |
| 3,947,524 | 3/1976 | Hozumi et al. | 260/873 |
| 3,957,921 | 5/1976 | Iwahashi et al. | 260/873 |
| 4,122,130 | 10/1978 | Fava | 260/873 |

*Primary Examiner*—Wilbert J. Briggs, Sr.
*Attorney, Agent, or Firm*—Connolly and Hutz

[57] ABSTRACT

Thermoplastic moulding compositions of
1. 80 to 20 parts by weight of a thermoplastic polycarbonate based on bis-(hydroxyaryl)-alkanes,
2. 20 to 80 parts by weight of a graft polymer of 20 to 90% by weight of a mixture of 95 to 5 parts by weight of styrene and/or methyl methacrylate, 50 to 5 parts by weight of acrylonitrile or methacrylonitrile and 50 to 0 parts by weight of a N-substituted maleic imide the total being 100 parts by weight on 10 to 80% by weight of a rubber,
3. 0 to 75 parts by weight of a copolymer of 95 to 50% by weight of styrene and/or methyl methacrylate and 50 to 5% by weight of acrylonitrile or methacrylonitrile,
4. 2 to 75 parts by weight of a copolymer of 95 to 50 parts by weight of styrene and/or methyl methacrylate, 40 to 5 parts by weight of acrylonitrile or methacrylonitrile, 2 to 40 parts by weight of a N-substituted maleic imide.

5 Claims, No Drawings

THERMOPLASTIC MOULDING COMPOSITION

This invention relates to thermoplastic moulding compositions prepared from a mixture of:

1. polycarbonate based on aromatic hydroxyl compounds;
2. a graft polymer of radically polymerisable monomers on a rubber; and
3. a thermoplastic resin consisting mainly of styrene and acrylonitrile; and/or
4. a thermoplastic resin synthesized mainly from styrene, acrylonitrile and N-substituted maleic imides.

Mixtures of a polycarbonate of aromatic hydroxyl compounds with a graft polymer which has been prepared from polybutadiene and a mixture of acrylonitrile and an aromatic vinyl hydrocarbon have been disclosed in German Auslegeschrift No. 1 170 141. Compared with pure aromatic polycarbonates, these mixtures are improved in their processibility and their flow properties.

However, moulded articles produced from these mixtures have insufficient strength along their coalescence seam. For example, an article in the form of a lattice produced by injection moulding is liable to break on removal from the mould.

Moulding composition which are greatly improved in the strength of the coalescence seam in articles produced therefrom have been proposed in German Offenlegungsschrift No. 2,259,565. This improvement is obtained by using a definite quantity of rubber of a specific particle size.

All previously known thermoplastic mixtures of aromatic polycarbonates and ABS graft polymers have a greatly reduced dimensional stability in the heat (Vicat temperature). These thermoplasts, which are otherwise very interesting from a technological point of view, therefore cannot be used where high dimensional stability is required.

The present invention relates to thermoplastic moulding composition consisting of:

1. 80 to 20 parts by weight of a thermoplastic polycarbonate based on bis-(hydroxyaryl)-alkanes,
2. 20 to 80 parts by weight of a graft polymer of 20 to 90% by weight of a mixture of 95 to 5 parts by weight of styrene and/or methyl methacrylate, 50 to 5 parts by weight of acrylonitrile or methacrylonitrile, 50 to 0 parts by weight of a N-substituted maleic imide, the total being 100 parts by wt. on 10 to 80% by weight of a rubber,
3. 0 to 75 parts by weight of a copolymer of 95 to 5% by weight of styrene and/or methylmethacrylate and 50 to 5% by weight of acrylonitrile or methacrylonitrile,
4. 2 to 75 parts by weight of a copolymer of 95 to 50 parts by weight of styrene and/or methylmethacrylate, 40 to 5 parts by weight of acrylonitrile or methacrylonitrile, 2 to 40 parts by weight of a N-substituted maleic imide, the total being 100 parts by weight.

The final moulding compositions contain preferably from 5 to 35, most preferably from 10 to 25% by weight of rubber.

According to a preferred embodiment of the invention, the maleic imide copolymers (4) are added to mixtures of (1), (2) and (3) which are free from maleic imide.

The moulding compositions according to the invention are distinguished by their high dimensional stability combined with good processibility and flow properties.

In addition to the improved dimensional stability, the strength in the coalescence seam is also superior to that obtained from the mixtures according to German Offenlegungsschrift No. 2,259,565. Finely divided ABS graft polymers (particle size approximately 0.01 to 0.2 microns), coarsely divided ABS graft copolymers (particle size approximately 0.3 to 0.6 microns) and agglomerated rubbers (particle size above 1 micron) may be used for the mixtures according to the invention. Strengths in the coalescence seam of over 12 KJ/m$^2$ are obtained with rubber contents of even less than 10% by weight.

Thermoplastic polycarbonates (1) within the meaning of this invention are homopolycarbonates and copolycarbonates which may be based, for example, on one or more of the following bisphenols:
Hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
α,α-bis-(hydroxyphenyl)-diisopropyl-benzenes
as well as derivatives of these compounds which are alkylated or halogenated in the nucleus.

These and other suitable aromatic dihydroxy compounds have been described, for example, in U.S. Pat. Nos. 3,028,365; 2,999,835; 3,148,172; 3,271,368; 2,991,273; 3,271,367; 3,280,078; 3,014,891 and 2,999,846, in German Offenlegungsschriften Nos. 1,570,703; 2,063,050; 2,063,052; 2,211,956 and 2,211,957, in French Patent Specification No. 1,561,518 and in the monograph "H. Schnell, Chemistry and Physics of Polycarbonates, Interscience Publishers, New York, 1964".

Preferred bisphenols are those of the following Formula

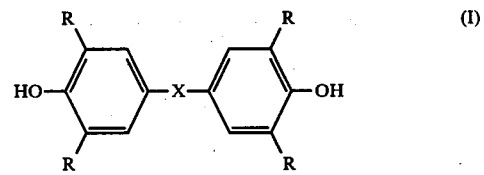

wherein the substitutents represented by R may be identical or different and denote H, $C_1$-$C_4$-alkyl, Cl or Br and X denotes a direct bond, $C_1$-$C_8$-alkylene, $C_2$-$C_8$-alkylidene, $C_5$-$C_{15}$-cycloalkylenes, $C_5$-$C_{15}$-cycloalkylidene, —$SO_2$— or

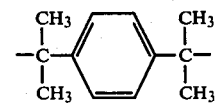

The following are examples of these bisphenols:
4,4'-Dihydroxydiphenyl,
2,2-bis-(4-hydrox phenyl)-propane,
2,4-bis-(4-hydroxyphenyl-2-methylbutane, 1,1-bis-(4-hydroxyphenyl)-cyclohexane,
α,α-bis-(4-hydroxyphenyl)-p-diisocpropylbenzene,
2,2-bis-(3-methyl-4-hydroxyphenyl)-propane,
2,2-bis-(3-chloro-4-hydroxyphenyl)-propane,
bis-(3-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane,
α,α-bis-(3,5-dimethyl-4-hydroxyphenyl)-p-diisopropylbenzene,
2,2-bis-(3,5-dichloro-4-hydroxyphenyl)-propane and
2,2-bis-(3,5-dibromo-4-hydroxyphenyl)-propane.

The following are examples of bisphenols which are particularly preferred:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane.

The preferred aromatic polycarbonates are those which are based on one or more of the bisphenols which have been mentioned as being preferred. Particularly preferred are copolycarbonates which are based on 2,2-bis-(4-hydroxyphenyl)-propane and one of the other bisphenols which have been mentioned as being particularly preferred. Polycarbonates based solely on 2,2-bis-(4-hydroxyphenyl)-propane or on 2,2-bis-(3,5-dimethyl-4-hydroxyphenyl)-propane are also particularly preferred.

The aromatic polycarbonates may be prepared by known processes, for example by solvent-free transesterification of bisphenols and diphenylcarbonate or by the diphasic interface process from bisphenols and phosgene, as described in the literature cited above.

The high molecular weight, aromatic polycarbonates may be branched by the incorporation of small quantities, preferably between 0.05 and 2.0 mol percent, (based on the quantity of diphenols used), of trifunctional or more than trifunctional compounds, particularly compounds, which have three or more phenolic hydroxyl groups.

Polycarbonates of this kind have been described, for example, in German Offenlegungsschriften Nos. 1,570,533; 1,595,762; 2,116,974 and 2,113,347; British Patent Specification No. 1,079,821; U.S. Pat. No. 3,544,514 and German Patent Application No. P 25,00,092.4.

The following are examples of suitable compounds which have three or more phenolic hydroxyl groups:
Phloroglucinol, 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methylbenzyl)-4-methylphenol; 2-(4-hydroxyphenyl)-2-(2,4-dihydroxyphenyl)-propane; hexa-[4-(4-hydroxyphenyl isopropyl)-phenyl]-ortho-terephthalic acid ester; tetra-(4-hydroxyphenyl)-methane; tetra-[4-(4-hydroxyphenyl isopropyl)-phenoxy]-methane and 1,4-bis-(4',4''-dihydroxytriphenyl)-methyl-benzene. Some of the other trifunctional compounds include 2,4-dihydroxybenzoic acid, trimesic acid, cyanuric chloride and 3,3-bis-(4-hydroxyphenyl)-2-oxo-2,3-dihydroindole.

The high molecular weight, aromatic polycarbonates should generally have average molecular weights $\overline{M}_w$ of at lease 10,000, more particularly from 10,000 to 200,000, preferably from 20,000 to 80,000, determined by measurements of the relative viscosity at a concentration of 0.5% by weight in $CH_2Cl_2$ at 25° C.

The graft polymers (2) may be prepared by polymerisation of the monomers in the presence of a rubber. In these products, a monomer mixture of 95 to 50 parts by weight of styrene or methyl methacrylate or mixture thereof, 5 to 50 parts by weight of acrylonitrile, methacrylonitrile or mixtures thereof and 0 to 50 parts by weight of a N-substituted maleic imide is polymerised in the presence of a rubber. The graft polymer may consist of from 80 to 10 parts by weight of rubber and 20 to 90 parts by weight of the polymerised monomer mixture which is at least partly chemically attached to (i.e. "grafted on") the rubber. As a general rule, only part of the monomer is in fact grafted. Ungrafted copolymer is generally present in addition to this grafted portion.

Rubbers suitable for use in this invention are in particular diene rubbers such as polybutadiene, butadiene/styrene copolymers containing up to 30% by weight of polymerised styrene, copolymers of butadiene and acrylonitrile containing up to 20% by weight of acrylonitrile, or copolymers of butadiene with up to 20% by weight of a lower alkyl ester of acrylic or methacrylic acid (e.g. methyl acrylate, ethyl acrylate, methyl methacrylate or ethyl methacrylate).

Ethylene/propylene/diene polymers, so-called EPDM systems, are also suitable. In principle, any elasticising components may be used, provided they have the properties of rubber elastic material.

The graft copolymers may be prepared in known manner by radical polymerisation of the monomers in the presence of the rubber, either in the absence of a solvent or as emulsions or suspensions, or they may be obtained by combination processes such as solvent-free/suspension polymerisation or solution/precipitation polymerisation. Graft polymers based on polybutadiene, for example, may be prepared by polymerisation of the monomers such as styrene and acrylonitrile in the presence of a latex of the butadiene polymer. The polymer particles in the latex of the butadiene polymer generally have a particle size of from $0.2\mu$ to $5\mu$.

Graft polymers with polymer particles measuring from $0.05\mu$ to $0.8\mu$, may also be produced by emulsion polymerisation. The preparation of the graft polymers to be used according to the invention is not restricted to the process of emulsion polymerisation. The graft polymers may also be obtained by dissolving the rubber in the monomers for example in styrene and acrylonitrile, initiating polymerisation by heating and by the addition of radical formers, producing a suspension by the addition of water after a certain quantity of monomer has been added, and finally completing the reaction as a process of bead polymerisation. Such a procedure has already been described, for example, in German Auslegeschrift No. 1,245,131.

In addition to the graft polymer (2), the moulding compound according to the invention may optionally contain a copolymer (3) of the graft monomers or similar monomers. These copolymers are to a large extent identical to those which are formed when rubber grafting takes place, but they may be added to the graft polymers in addition.

The maleic copolymers (4) are synthesised from known radically polymerisable monomers and may be prepared either in solution or by polymerisation in emulsion or suspension, optionally with the addition of chain regulators. Styrene, acrylonitrile and methyl methacrylate are preferred monomers used for this purpose.

The maleic imides may be prepared by a process described in German Offenlegungsschrift No. 1,934,791, according to which maleic imide is reacted with the corresponding amine to form a semi-amide, followed by ring closure to form the maleic imide. The following are examples of maleic imides which may be used for preparing the copolymer (4):
N-methyl-maleic imide,
N-butyl-maleic imide,
N-cyclohexyl-maleic imide,
N-phenyl-maleic imide,
N-(2-Cl-phenyl)-maleic imide,
N-(3-Cl-phenyl)-maleic imide,
N-(3-methyl-phenyl)-maleic imide;
N-(3,5-dimethyl-phenyl)-maleic imide,
N-benzyl-maleic imide and
N-(3-methoxy-phenyl)-maleic imide.

The three or four components of the moulding compounds according to the present invention may be prepared separately and then mixed together in known mixing apparatus. Suitable apparatus for this purpose are, for example, mixing rollers, double screw extruders and internal mixers. Alternatively, a mixture of the graft polymer and the copolymers, i.e. the mixture summarised under (2), (3) and (4) may first be prepared by working the components together, and this mixture may then be combined with the polycarbonate. Fillers, glass fibres, pigments or other additives such as stabilizers, flame retarding agents, fluidising agents, lubricants mould release agents or antistatic agents may be added to the moulding compounds during the mixing process.

The moulding compounds according to the present invention may be used for the manufacture of any kind of moulded articles. In particular, they may be used for the production of injection moulded articles used where high dimensional stability in the heat and high strengths in the coalescence seam are required.

1. Method of preparation of the polycarbonates used

Approximately 454 parts of 4,4'-dihydroxydiphenyl-2,2-propane and 9.5 parts of p-tertiary butyl phenol were suspended in 1.5 l of water. In a 3-necked flask equipped with stirrer and gas inlet tube, the oxygen was removed from the reaction mixture by passing nitrogen through the mixture for 15 minutes with stirring. 355 Parts of 45% sodium hydroxide solution and 1000 parts of methylene chloride were then added and the resulting mixture was cooled to 25° C. 237 Parts of phosgene were added over a period of 120 minutes while the temperature was maintained at 25° C. by cooling. An additional quantity of 75 parts of a 45% sodium hydroxide solution was added after 15 to 30 minutes or after uptake of phosgene had begun. 1.6 Parts of triethylamine were added to the resulting solution, and the mixture was then stirred for 15 minutes. A highly viscous solution was obtained, and the viscosity was regulated by the addition of methylene chloride. The aqueous phase was separated off and the residual organic phase was freed from salt and alkali by washing with water. The polycarbonate was isolated from the washed solution and dried. It had a relative viscosity of 1.29 to 1.30, determined on a 0.5% solution of methylene chloride at 20° C. This corresponds approximately to a molecular weight of 32,000. The polycarbonate obtained in this way was extruded and granulated.

II. Method of preparation of a N-methyl-maleic imide copolymer 165 g of N-methyl-maleic imide (15% by weight) were dissolved in 748 g of styrene (68% by weight) and 187 g of acrylonitrile (17% by weight) with stirring at room temperature under a stream of nitrogen. A solution of 66 g of Mersolat K 30 in 3940 g of water (1.6%) was then added. After the addition of 2.64 g of potassium peroxydisulphate, the mixture was slowly heated to 80° C. with vigorous stirring and kept at this temperature for 3 hours. The emulsion was then heated to 90° C. for 30 minutes.

Precipitation:

8720 g of a 4% aqueous magnesium sulphate solution preheated to 90° C. were introduced into the reaction vessel. The whole emulsion, which had also been preheated to 90° C., was then run in with stirring. The precipitated polymer was subsequently filtered and washed free from sulphate with water.

| Conversion: | 97.0% |
| --- | --- |
| N Found: | 5.40% |
| N Theoretical value: | 5.66%. |

The nature of the invention will now be explained in more detail with the aid of the following Examples. Examples 1 and 6 are comparison examples.

The mechanical properties of the thermoplastic compounds according to the invention are summarised in the Table.

EXAMPLE 1 (Comparison example)

60 Parts by weight of an ABS graft polymer mixture consisting of
(a) 30 parts by weight of a graft polymer prepared by grafting 35 parts by weight of styrene and 15 parts by weight of acrylonitrile on 50 parts of a coarse textured polybutadiene (prepared by emulsion polymerisation according to the methods indicated in German Auslegeschrift No. 1,247,665 and 1,269,360), in which the average particle diameter of the polybutadiene graft base which is in the latex form is between 0.3 and 0.4 $\mu$m and
(b) 70 parts by weight of a styrene-acrylonitrile copolymer containing styrene and acrylonitrile in proportions of 70:30 and having a relative viscosity of 1.45 (determined in $CH_2Cl_2$ at 25° C. and a concentration of 5 g/l) were intimately mixed with 40 parts by weight of an aromatic polycarbonate based on 4,4'-dihydroxydiphenylpropane-(2,2) (bisphenol A) having a relative viscosity of $\eta_{rel} = 1.31$ (determined in methylene chloride at 25° C. and a concentration of 5 g/l) in an internal kneader at 240° C. and subsequently granulated.

EXAMPLE 2

60 Parts by weight of an ABS graft polymer mixture consisting of
(a) 30 parts by weight of the graft copolymer from Example 1 and
(b) 70 parts by weight of a maleic imide copolymer obtained from 68% by weight of styrene, 17% by weight of acrylonitrile and 15% by weight of N- methyl-maleic imide and having a relative viscosity of 2.10 were intimately mixed with 40 parts by weight of an aromatic polycarbonate from Example 1 in an internal kneader at 240° C. and then granulated.

EXAMPLE 3

50 Parts by weight of an ABS graft polymer mixture consisting of
(a) 65 parts by weight of the graft polymer from Example 1 and
(b) 35 parts by weight of a maleic imide copolymer obtained from 63% by weight of styrene, 17% by weight of acrylonitrile and 20% by weight of N-methyl-maleic imide and having a relative viscosity of 2.35 were mixed with 50 parts by weight of an aromatic polycarbonate based on bisphenol A (relative viscosity 1.31) in a double screw extruder at 260° C. and then granulated.

EXAMPLE 4

60 Parts by weight of an ABS graft polymer mixture consisting of
(a) 50 parts by weight of the graft polymer from Example 1,
(b) 25 parts by weight of a copolymer of styrene/acrylic nitrile (ratio 70:30) having a relative viscosity of 1.60 and
(c) 25 parts by weight of a copolymer of styrene/acrylonitrile/N-cyclohexyl-maleic imide (ratios 49:21:30) having a relative viscosity of 2.52 and 40 parts by weight of an aromatic polycarbonate based on 93 mol% of bisphenol A and 7 mol% of tetrabromobisphenol A and having a relative viscosity of 1.31 were together extruded in a double screw extruder at 260° C. and granulated.

EXAMPLE 5

35 Parts by weight of an ABS graft polymer mixture consisting of
(a) 30 parts by weight of a graft polymer prepared by grafting 25 parts by weight of styrene and 5 parts by weight of acrylonitrile on 70 parts by weight of a coarse-textured polybutadiene (according to German Auslegeschriften Nos. 1,247,665 and 1,269,360), in which the average particle diameter of the polybutadiene graft base which is in the latex form is between 0.3 and 0.4 μm, and
(b) 70 parts by weight of a styrene/acrylonitrile/N-cyclohexyl-maleic imide copolymer (ratios 70:20:10) having a relative viscosity of 2.24 and 65 parts by weight of an aromatic polycarbonate based on bisphenol A and having a relative viscosity of 1.29 were together extruded in a double screw extruder at 260° C. and granulated.

EXAMPLE 6 (Comparison example)

50 parts by weight of a ABS graft polymer mixture consisting of
(a) 70 parts by weight of a graft polymer prepared by grafting 35 parts by weight of styrene and 15 parts by weight of acrylonitrile on 50 parts by weight of a finely divided polybutadiene having an average particle diameter of from 0.05 to 0.15 μm and
(b) 30 parts by weight of a copolymer of styrene/acrylonitrile in proportions of 70:30 having a relative viscosity of 1.65 and 50 parts by weight of an aromatic polycarbonate based on bisphenol A and having a relative viscosity of 1.29 were together homogenised in an internal mixer at 250° C. and granulated.

EXAMPLE 7

50 Parts by weight of an ABS graft polymer mixture consisting of
(a) 70 parts by weight of a graft polymer from Example 6 and
(b) 30 parts by weight of a copolymer obtained from 49% by weight of styrene, 21% by weight of acrylonitrile and 30% by weight of N-methyl-maleic imide and having a relative viscosity of 2.63 were homogenised with 50 parts by weight of an aromatic polycarbonate from Example 6 in an internal kneader at 250° C. and then granulated.

EXAMPLE 8

70 Parts by weight of an ABS graft polymer mixture consisting of
(a) 60 parts by weight of the graft polymer from Example 1 and
(b) 30 parts by weight of the styrene/acrylonitrile copolymer from Example 1 and
(c) 10 parts by weight of the styrene/acrylonitrile/cyclohexylmaleic imide copolymer from Example 4 and 30 parts by weight of an aromatic polycarbonate based on bisphenol A and having a relative viscosity of 1.32 were together extruded in a double screw extruder and granulated.

EXAMPLE 9

60 Parts by weight of an ABS graft polymer mixture consisting of
(a) 30 parts by weight of a graft polymer prepared by grafting 30 parts by weight of styrene, 10 parts by weight of acrylonitrile and 10 parts by weight of N-cyclohexylmaleic imide on 50 parts by weight of a coarse textured polybutadiene (prepared by emulsion polymerisation according to German Auslegeschriften Nos. 1,247,665 and 1,269,360) in which the average particle diameter of the polybutadiene graft base which is in the latex form is between 0.3 and 0.4 μm and
(b) 70 parts by weight of a styrene/acrylonitrile/N-cyclohexyl-maleic imide copolymer (ratios 68:17:15) having a relative viscosity of 1.95 were intimately mixed with 40 parts by weight of an aromatic polycarbonate based on 4,4'-dihydroxydiphenylpropane-(2,2) (bisphenol A) having a relative viscosity of $\eta_{rel} = 1.28$ (determined in methylene chloride at 25° C. and a concentration of 5 g/l) in an internal kneader at 240° C. and then granulated.

Table

| Example | 1 | 2 | 3 | 4 | 5 | 6 | 7 | 8 | 9 |
|---|---|---|---|---|---|---|---|---|---|
| Polycarbonate (1) Pts. by wt. | 40 | 40 | 50 | 40 | 65 | 50 | 50 | 30 | 40 |
| Graft polymer (2) Pts. by wt. | 18 | 18 | 32.5 | 30 | 10.5 | 35 | 35 | 42 | 18 |
| Copolymer (3) Pts. by wt. | 42 | — | — | 15 | — | 15 | — | 21 | — |

Some characteristic properties of the mixtures from Examples 1-9

Table-continued

Some characteristic properties of the mixtures from Examples 1–9

| Example | 1 | 2 | 3 | 4 | 5 | 6 | 7 | 8 | 9 |
|---|---|---|---|---|---|---|---|---|---|
| Maleic imide copolymer (4) Pts. by wt. | — | 42 | 17.5 | 15 | 24.5 | — | 15 | 7 | 42 |
| Rubber Pts. by wt. | 9 | 9 | 16.3 | 15 | 7.4 | 17.5 | 17.5 | 21 | 9 |
| ZFLNF[1] KJ/m$^2$ | 4 | 13 | 11 | 9 | 11 | 3 | 12 | 10 | 12 |
| Notched impact strength[2] KJ/m$^2$ | 26 | 20 | 29 | 23 | 28 | 29 | 25 | 15 | 21 |
| Vicat B[3] °C. | 108 | 126 | 122 | 119 | 130 | 110 | 124 | 112 | 125 |

[1]According to DIN 53 453
[2]DIN 53 453
[3]DIN 53 460

I claim:

1. A thermoplastic moulding composition comprising
   (1) 80 to 20 parts by weight of a thermoplastic polycarbonate based on a bis-(hydroxyaryl)-alkane;
   (2) 20 to 80 parts by weight of a graft polymer of 20 to 90% by weight of a mixture of 95 to 5 parts by weight of styrene, methyl methacrylate or a mixture thereof, 50 to 5 parts by weight of acrylonitrile or methacrylonitrile, 50 to 0 parts by weight of a N-substituted maleic imide, the total being 100 parts by weight on 10 to 80% by weight of a rubber;
   (3) 0 to 75 parts by weight of a copolymer of 95 to 50% by weight of styrene, methylmethacrylate or a mixture thereof and 50 to 5% by weight of acrylonitrile or methacrylonitrile; and
   (4) 2 to 75 parts by weight of a copolymer of 95 to 50 parts by weight of styrene, methylmethacrylate or a mixture thereof, 40 to 5 parts by weight of acrylonitrile or methacrylonitrile, and 2 to 40 parts by weight of a N-substituted maleic imide, selected from the group consisting of N-methyl-maleic imide, N-butyl-maleic imide, N-cyclohexyl-maleic imide, N-phenyl-maleic imide, N-(2-Cl-phenyl)-maleic imide, N-(3-Cl-phenyl)-maleic imide, N-(3-methyl-phenyl)-maleic imide; N-(3,5-dimethyl-phenyl)-maleic imide, N-benzyl-maleic imide and N-(3-methoxy-phenyl)-maleic imide, the total being 100 parts by weight.

2. The moulding composition of claim 1 wherein said rubber is polybutadiene, a copolymer of butadiene and styrene having up to 30% by weight of polymerized styrene therein, a copolymer of butadiene and acrylonitrile having up to 20% by weight of polymerized acrylonitrile therein, a copolymer of butadiene and a lower alkyl ester of acrylic or methacrylic acid having up to 20% by weight of copolymerized lower alkyl ester therein or a terpolymer of ethylene, propylene and a diene.

3. The moulding composition of claim 1 containing from 5 to 35% by weight of rubber.

4. The moulding composition of claim 1 containing from 10 to 25% by weight of rubber.

5. An article obtained by moulding the composition of claim 1.